United States Patent [19]
Takeda et al.

[11] Patent Number: 4,790,794
[45] Date of Patent: Dec. 13, 1988

[54] FLEXIBLE SHAFT COUPLING FOR TRANSMISSION OF HIGH TORQUE LOADS

[75] Inventors: Masaru Takeda, Toyota; Yoshihiro Nunotaki, Okazaki; Hiroshi Harada, Tsu; Michihiro Kawada, Nagoya; Masahiro Ishigaki, Tsu, all of Japan

[73] Assignees: Toyo Tire & Rubber Co., Ltd., Osaka; Toyota Jidosha Kabushiki Kaisha, Aichi, both of Japan

[21] Appl. No.: 98,062

[22] Filed: Sep. 17, 1987

[30] Foreign Application Priority Data

Nov. 7, 1986 [JP] Japan .................. 61-171638[U]

[51] Int. Cl.⁴ .............................................. F16D 3/78
[52] U.S. Cl. ...................................................... 464/93
[58] Field of Search ........................... 464/92, 93, 94

[56] References Cited

FOREIGN PATENT DOCUMENTS

| 509999 | 10/1930 | Fed. Rep. of Germany | 464/93 |
| 1021212 | 12/1957 | Fed. Rep. of Germany | 464/94 |
| 45-2482 | 1/1970 | Japan | 464/93 |
| 52-1351 | 1/1977 | Japan | 464/94 |
| 35539 | 8/1981 | Japan | |
| 146623 | 10/1984 | Japan | |

Primary Examiner—Daniel P. Stodola
Attorney, Agent, or Firm—Flynn, Thiel, Boutell & Tanis

[57] ABSTRACT

Flexible shaft coupling for transmission of high torque loads comprising drive side and driven side connecting elements arranged in pairs alternately and equidistantly in a circumferential orientation, endless belts of fiber cord bundles wrapping around and interlinking pairs of adjacent drive side and driven side connecting elements, and an elastomeric material embedding therein the foregoing members. Between the connecting elements and the belts there are mounted bobbin-like collars each having both terminal flanges defining a hollow of U-shaped cross-section between them, and the belts are received and held in the hollows. By the construction, disorder or relaxing in cords is not caused and loads are dispersed uniformly on the cords with the result that high torque transmission efficiency is attained.

6 Claims, 3 Drawing Sheets

FLEXIBLE SHAFT COUPLING FOR TRANSMISSION OF HIGH TORQUE LOADS

BACKGROUND OF THE INVENTION

1. Field of the Invention

This invention relates to a flexible shaft coupling for transmission of high torque loads which is installed between a drive shaft and a driven shaft of general industrial machinery, automobiles, etc. in order to transmit torques while absorbing deflections between them.

2. Related Art Statement

For a flexible shaft coupling for transmission of high torque loads to be installed on drive shafts, etc. of automobiles, for instance, a coupling as shown in the accompanying FIG. 4 has been formerly known. This coupling is constructed of cylindrical drive side connecting elements (3) for holding therethrough bolts (2) secured to the rod end of a drive shaft (1) corresponding to an output shaft on the engine side and cylindrical driven side connecting elements (6) for holding therethrough bolts (5) secured to the rod end of a driven shaft (4) corresponding to a propeller shaft, both of which are arranged alternately in pairs along the circumference of the coupling. Pairs of adjacent connecting elements (3)(6) are interlinked by wrapping thereabout endless belts (8) of fiber bundles having elasticity which are formed by winding reinforcing cords (7) of polyester yarns in multiple plies and multiple rows and further coated peripherally with a rubber or synthetic resin material (9) whereby they are integrally fabricated into a ring-shaped coupling which is rectangular in cross-section. With a view toward preventing the wrapped portions of the fiber bundles from being rubbed against each other and the superposing arrangement of the reinforcing cords (7) from being disturbed, collars (10) which are press molded in the form of a disk having a L-shaped cross-section are press-fitted and held on the outer peripheries of the drive side connecting elements (3) and the driven side connecting elements (6).

Such type of couplings are disclosed, for example, in Japanese Utility Model Publication No. 56-35539 (1981), Japanese Utility Model (Unexamined) Publication No. 59-146623 (1984), etc.

In the flexible couplings having the known structure noted above, in case where high loads act upon the belts (8) of fiber bundles as a result of fluctuation in load on the drive shaft side (4), the bundles of reinforcing cords (7) are squashed in the radial direction and spread in the axial direction to move the collars (10) outwardly and consequently, arrangement of the reinforcing cords (7) is disordered, causing them to relax. Thus, they were defective in that cord strength is diminished and efficiency of torque transmission is aggravated.

Further, in the event that the arrangement of the reinforcing cords (7) constituting the belts (8) of fiber cord bundles was changed, the odds are that the reinforcing cords (7) rub against one another owing to the fluctuation in torque. Hence, existing flexible couplings had to be replaced early in this respect.

SUMMARY OF THE INVENTION

This invention has been accomplished to cope with the problems the prior art flexible couplings for transmission of high torque loads have posed.

Accordingly, this invention is designed for an improvement in a flexible coupling of the type referred to above and has for an essential object to provide a flexible coupling for transmission of high torque loads wherein reinforcing cords constituting endless belts of fiber bundles are prevented from being disordered by mounting bobbin-shaped collars having both end flanges on the outer circumferences of the drive side and driven side connecting elements whereby the wrapped portions of the belts are received and held in annular trough-like hollows of the collars defined by the flanges.

According to this invention, there is provided a flexible coupling for transmission of high torque loads, comprising a plurality of cylindrical drive side connecting elements adapted to be connected to a drive shaft and a plurality of cylindrical driven side connecting elements adapted to be connected to a driven side shaft which both are arranged in pairs equidistantly and alternately along the circumference of the coupling, endless belts composed of fiber cord bundles interlinking and wrapping around each pair of adjacent drive side connecting elements and driven side connecting elements, and an elastomer matrix embedding both connecting elements together with the endless belts therein, which coupling is characterized in that on the outer circumferences of the drive side and driven side connecting elements there are mounted bobbin-like collars each provided with flanges at both ends of a short cylindrical tube, thus forming an annular hollow having a U-shaped cross-section, and wrapped portions of the fiber bundle belts are received and held captively in the annular hollows defined by the flanges and the tube.

The flexible coupling thus constructed serves to transmit powers while absorbing deflection between a drive shaft and driven shaft when fixed to the drive shaft and the driven shaft, with the drive side connecting elements secured to the end of the drive shaft through bolts and the driven side connecting elements secured to the end of the driven shaft through bolts. In that state, when high loads act upon the fiber bundle belts interlinking the drive side and driven side connecting elements, and reinforcing cords constituting the fiber bundle belts are likely to extend in the width direction of the belts, the flanges at both ends of the collars can hold firmly wrapped portions of the belts in a pinching manner to prevent deformation of them, so that the efficiency of torque transmission of the flexible coupling per se is maintained at good level. Furthermore, lifetime of the coupling is significantly lengthened since disorder in the arrangement of the reinforcing cords is avoided and mutual friction among the reinforcing cords is impeded because of the end flanges.

DETAILED DESCRIPTION OF THE PREFERRED EMBODIMENTS

Preferred embodiments of the invention will be hereinbelow described in more detail with reference to the accompanying drawings.

Figure 1:
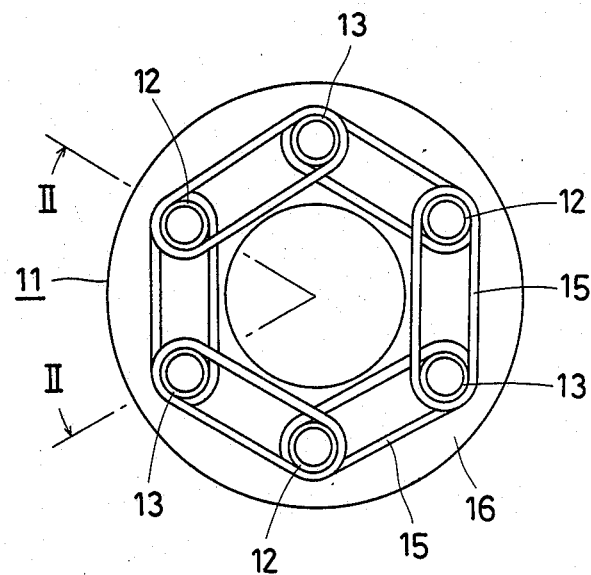
FIG. 1 is a plan view in cross-section showing one example of a flexible shaft coupling for transmission of high torque loads pertaining to this invention.
Figure 2:
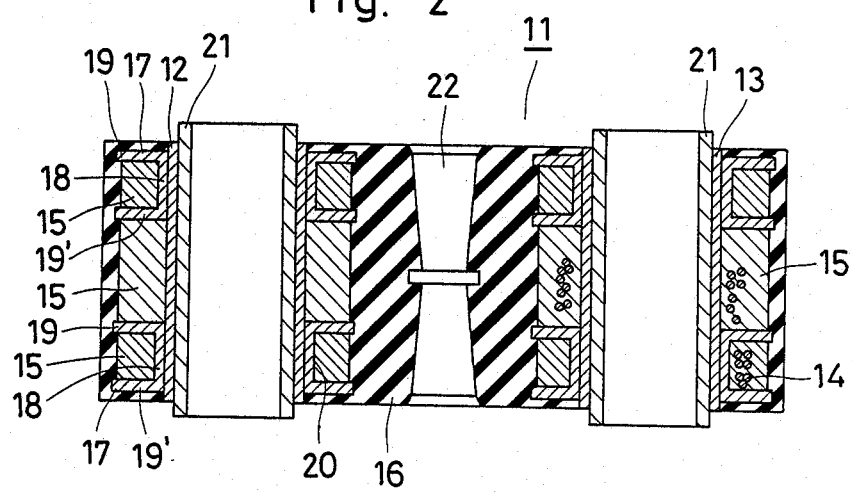
FIG. 2 is a cross-sectional view taken along the line II—II of FIG. 1.

In one example illustrated in FIGS. 1 and 2, a flexible coupling device 11 is fabricated integrally in the configuration of a ring which is rectangular in cross-section by arranging a plurality of, for example, three pieces of cylindrical drive side connecting elements 12 bolted to a yoke (not shown) on the drive shaft side and a plurality of, for example, the same three pieces of cylindrical driven side connecting elements 13 bolted to a yoke (not shown) on the driven shaft side equidistantly and alternately along a concentrical circumference of the device, wrapping around and interlinking pairs of adjacent drive side connecting elements 12 and driven side connecting elements 13 with endless belts 15 composed of fiber cord bundles which are formed by winding reinforcing cords 14 such as polyester yarns in multiple plies and multiple rows in a loop fashion, and embedding the connecting elements together with the fiber bundle belts 15 in an elastomeric material 16 such as rubber or synthetic resin so that central holes of the connecting elements 12, 13 may be exposed exteriorly.

The reference numeral 17 designates collars which are press-fitted and mounted on the outer peripheries of the drive side connecting elements 12 and the driven side connecting elements 13 at both ends of them, and constitute an essential part of this invention. The collars 17 assume a bobbin-like shape and an constructed integrally each of a short cylindrical tube 18 mounted on the outer peripheries of the connecting elements 12, 13 and flanges 19, 19' standing upright on both ends of the tube, thus defining a hollow 20 having a U-shaped cross-section surrounded by the flanges 19, 19' and the tube 18. In the hollows 20 of the collars 17, wrapped portions of the fiber belts 15 are fitted and retained.

In FIG. 2, the reference numeral 21 designates an inner sleeve fitted in the central holes of the drive side and driven side connecting elements 12,13 and the reference numeral 22 designates a bored portion pierced through the flexible coupling device 11 in the middle thereof.

In the example as shown, two kinds of the belts differing in sectional area are used, the one with a smaller sectional area being disposed on both sides of the other with a larger sectional area, and the collars 17 are mounted between the connecting element 12 or 13 and the belts 15 of smaller sectional area. Accordingly, the fiber bundle belts 15 of larger sectional area in the central zone are held in place by the axially outside faces of the flanges 19, 19' of the collars 17, so that reinforcing cords 14 of them are prevented from being disordered.

The manner in which the collars are mounted and the manner in which the belts 15 of fiber bundles are wrapped are not limited to the foregoing example, and various modifications in design are possible as shown in FIG. 3.

Figure 3A:
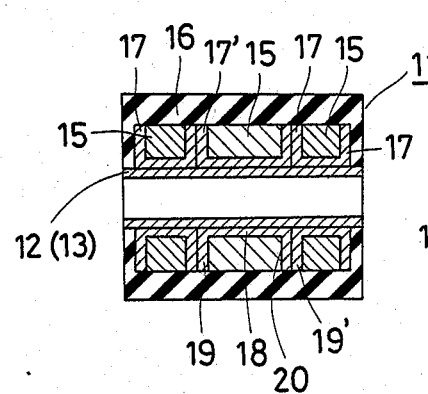
FIGS. 3 (*a*),(*b*),(*c*),(*d*) are partial elevational views in cross-section showing other examples of a flexible coupling according to this invention.

For example, in another example shown in FIG. 3(a), a collar 17' having a longer axial length is mounted on the connecting element 12, 13 so as to be interposed between collars 17, 17 having a shorter axial length and the belts 15 are wrapped about the collars 17, 17, 17'.

Figure 3B:
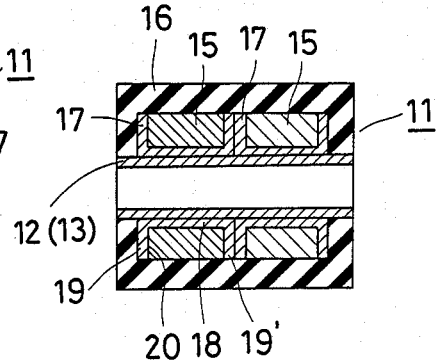

In a further example shown in FIG. 3(b), collars 17, 17 of the same length are press-fitted contiguous to each other and belts 15, 15 of fiber bundles having the same cross-sectional area are wrapped around the collars 17, 17. In both examples of FIG. 3(a) and FIG. 3(b), the flanges 19, 19' of adjacent collars 17, 17' or 17, 17 assume a dual flange, joining together in the axial direction.

Figure 3C:
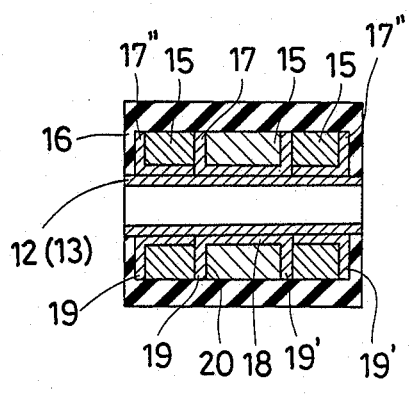
Figure 3D:
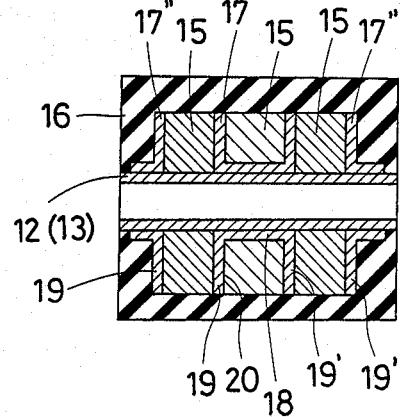
Figure 4:
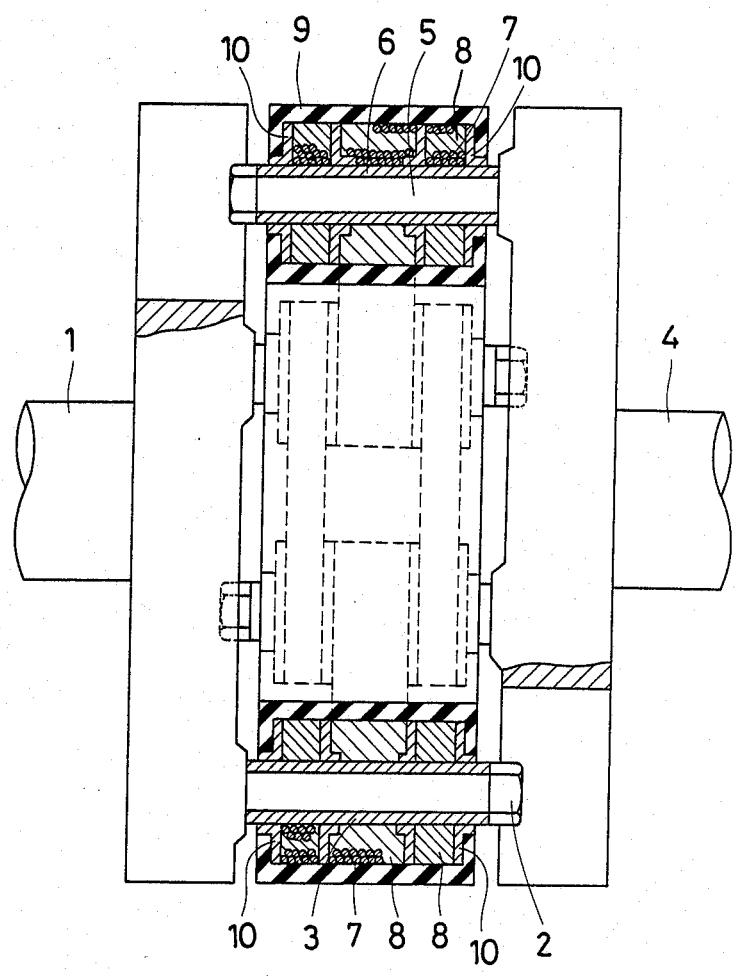
FIG. 4 is an elevational view in cross-section showing an example of a prior art flexible coupling for high torque transmission.

In case where the collars 17 having both terminal flanges 19, 19' is located in the central zone of the connecting element 12 or 13 as in FIG. 3(a), however, it is possible to locate, on both sides of the collar 17, other collars 17'', 17'' having L-shaped cross-section which have only one terminal flange on the axially external side as shown in FIG. 3(c) or on the internal side as shown in FIG. 3(d) so as to wrap the belts 15 around the collars in their hollows 20 (FIG. 3(c)) or so as to wrap the belts 15 around interstices between the two-flange collar 17 and one-flange collar 17'' surrounded by the flanges 19, 19' and the element 12 or 13 and around the hollows 20 (FIG. 3(d)). Likewise, it is also possible to replace either of the two-flange collars 17, 17 with a one-flange collar 17'' having only an outside flange and assuming a L-shaped cross-section.

Through FIGS. 1 to 3, like parts and like members are designated by like reference numerals.

In use, the flexible coupling thus constructed is installed by fixing the drive side connecting elements 12 through bolts to the yoke of the drive shaft and fixing the driven side connecting elements 13 through bolts to the yoke of the driven shaft. Torque loads on the drive shaft side are transmitted via the drive side connecting elements 12, the fiber bundle belts 15, and the driven side connecting elements 13 to the driven shaft.

When high loads act upon the fiber bundle belts 15 because of the fluctuation in load on the driven shaft side, the reinforcing cords 14 constituting the fiber belts 15 undergo radially inward forces in the wrapped portions around the connecting elements 12, 13 and as a result, the fiber bundles are likely to spread in the width direction. At this time, the collars 17, 17' press-fitted and mounted on the outer peripheries of the connecting elements 12, 13 hold firmly the wrapped portions of the fiber bundle belts by means of the flanges 19, 19' from both sides, thereby to impede disorder in arrangement of the reinforcing cords 14 and to disperse the loads to each of the reinforcing cords 14. As a consequence, efficiency of torque transmission of the flexible coupling can be maintained at good level and mutual friction among the reinforcing cords 14 is diminished with the result that durability life of the coupling is significantly enhanced.

Thus, the present invention provides a flexible coupling for transmission of high torque loads of a type comprising cylindrical drive side and driven side connecting elements arranged in pairs equidistantly and alternately in a circumferential orientation, endless belts of fiber bundles interlinking and wrapping around pairs of adjacent drive side and driven side connecting elements, and an elastomeric matrix such as rubber or synthetic resin matrix embedding therein the connecting elements and the belts and which is characterized in that bobbin-like collars each having flanges at both ends thereof are mounted on the outer circumferences of the drive side and driven side connecting elements and receive and hold, in their hollows, the wrapped portion of the belts whereby the wrapped belts are pinched by the flanges from both sides. Because of this construction, even if high loads act on the fiber bundle belts, disorder or relaxing in the reinforcing cords constituting the belts is not caused and the loads are dispersed uniformly on the respective reinforcing cords. As a consequence, a high torque transmission efficiency is attained and not only is durability life of the fiber bands enhanced since no friction occurs among the reinforcing cords in the wrapped portions, but also the life of the elastomeric member is lengthened.

We claim:

1. A flexible shaft coupling for transmission of high torque loads comprising:

drive side cylindrical connecting elements and driven side cylindrical connecting elements arranged in pairs alternately and equidistantly in a circumferential orientation;

plural endless belts composed of fiber bundles each wrapping around and interlinking pairs of adjacent drive side connecting elements and driven side connecting elements;

an elastomer matrix embedding said connecting elements together with said fiber bundle belts therein;

plural and separate bobbins-like collars mounted in axially spaced relation on the outer peripheries of said drive side connecting elements and said driven side connecting elements, each of said hollow-like collars being integrally formed of a short cylindrical tube and at least one radially extending, annular flange at least one end of said tube, said plural bobbin-like collars forming plural annular hollows each having a U-shaped cross-section defined by said radially extending flanges and said tube, one of said plural fiber bundle belts being received and held within each of said hollows, at least two of said collars being provided on each of said drive side connecting elements and said driven side connecting elements, said collars each having two spaced radially extending flanges thereon adapted to receive between mutually adjacent ones of said flanges one of said plural fiber bundle belts, said collars being U-shaped in cross-section and oriented side-by-side with the mutually adjacent, radially extending flanges, being axially spaced so as to define a hollow free of a tube therebetween and in which is received one of said plural fiber bundle belts confined in the axial direction by said radially extending flanges.

2. The flexible shaft coupling for transmission of high torque loads as claimed in claim 1, wherein each of said plural fiber bundle belts are formed into an endless loop form by winding plural reinforcing cords made of polyester yarns into multiple plies and multiple rows.

3. A flexible shaft coupling for transmission of high torque loads comprising:

drive side cylindrical connecting elements and driven side cylindrical connecting elements arranged in pairs alternately and equidistantly in a circumferential orientation;

plural endless belts composed of fiber bundles each wrapping around and interlinking pairs of adjacent drive side connecting elements and driven side connecting elements;

an elastomer matrix embedding said connecting elements together with said fiber bundle belts therein;

plural and separate bobbin-like collars mounted in axially spaced relation on the outer peripheries of said drive side connecting elements and said driven side connecting elements, each of said bobbin-like collars being integrally formed of a short cylindrical tube and at least one radially extending, annular flange at least one end of said tube, said plural bobbin-like collars forming plural annular hollows each having a U-shaped cross-section defined by said radially extending flanges and said tube, one of said plural fiber bundle belts being received and held within each of said hollows, at least three bobbin-like collars being provided one each of said drive side connecting elements and said driven side connecting elements, a centrally located one of said three bobbin-like collars having a U-shaped cross-section defined by a pair of radially extending flanges and a tube, the remaining two bobbin-like collars being L-shaped in cross-section and oriented on opposite axial ends of said central bobbin-like collar so that said radially extending flanges thereof are axially spaced from said radial flanges on said central collar.

4. The flexible shaft coupling for transmission of high torque loads as claimed in claim 1, wherein said L-shaped bobbin-like collars each have a tube concentrically oriented to said tube of said central collar and on a side of a respective one of said radial flanges that is remote from said central bobbin.

5. The flexible shaft coupling for transmission of high torque loads as claimed in claim 3, wherein said L-shaped bobbin-like collars each have a tube concentrically oriented to said tube of said central collar and on a side of a respective one of said radial flanges that faces said central bobbin.

6. The flexible shaft coupling for transmission of high torque loads as claimed in claim 3, wherein each of said plural fiber bundle belts are formed into an endless loop form by winding plural reinforcing cords made of polyester yarns into multiple plies and multiple rows.

* * * * *

UNITED STATES PATENT AND TRADEMARK OFFICE
CERTIFICATE OF CORRECTION

PATENT NO. : 4 790 794

DATED : December 13, 1988

INVENTOR(S) : Masaru TAKEDA et al.

It is certified that error appears in the above-identified patent and that said Letters Patent is hereby corrected as shown below:

Column 5, line 22; change "bobbins-like" to ---bobbin-like---.

Column 5, line 26; change "hollow-like" to ---bobbin-like---.

Signed and Sealed this

Twenty-third Day of May, 1989

Attest:

DONALD J. QUIGG

Attesting Officer

Commissioner of Patents and Trademarks